United States Patent
Kolesnik et al.

(10) Patent No.: US 10,175,975 B2
(45) Date of Patent: Jan. 8, 2019

(54) SELF-MENDING SOFTWARE BUILDER

(71) Applicant: Red Hat Israel, Ltd., Raanana (IL)

(72) Inventors: Michael Kolesnik, Ramat-Gan (IL); Moti Asayag, Netanya (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

(21) Appl. No.: 14/624,955

(22) Filed: Feb. 18, 2015

(65) Prior Publication Data
US 2016/0239295 A1   Aug. 18, 2016

(51) Int. Cl.
G06F 11/36 (2006.01)
G06F 8/71 (2018.01)
G06F 8/30 (2018.01)

(52) U.S. Cl.
CPC ............... G06F 8/71 (2013.01); G06F 8/30 (2013.01); G06F 11/3672 (2013.01)

(58) Field of Classification Search
None
See application file for complete search history.

(56) References Cited

U.S. PATENT DOCUMENTS

| | | | | |
|---|---|---|---|---|
| 5,694,540 A * | 12/1997 | Humelsine | ........... | G06F 11/3688 714/33 |
| 7,503,037 B2 * | 3/2009 | Banerjee | ............ | G06F 11/3676 717/120 |
| 7,568,183 B1 | 7/2009 | Hardy et al. | | |
| 7,596,778 B2 | 9/2009 | Kolawa et al. | | |
| 8,225,302 B2 | 7/2012 | Waugh et al. | | |
| 8,276,123 B1 * | 9/2012 | Deng | .................... | G06F 11/368 714/37 |
| 8,312,430 B2 | 11/2012 | Best et al. | | |
| 8,584,100 B2 * | 11/2013 | Xu | ........................ | G06F 11/368 717/126 |
| 8,788,884 B2 | 7/2014 | Perkins et al. | | |
| 8,839,188 B2 | 9/2014 | Chen et al. | | |
| 8,996,349 B2 * | 3/2015 | Belenky | .................... | G06F 8/10 703/22 |
| 9,176,731 B1 * | 11/2015 | Ziftci | ........................ | G06F 8/71 |

(Continued)

FOREIGN PATENT DOCUMENTS

JP  2002024013 A2  1/2002

OTHER PUBLICATIONS

Gorla, Alessandra, et al., "Achieving Cost-Effective Software Reliability through Self-Healing", https://www.google.com/url?sa=t&rct=j&q=&esrc=s&source=web&cd=5&cad=rja&uact=8&ved=0CD8QFjAE&url=http%3A%2F%2Fwww.cai.sk%2Fojs%2Findex.php%2Fcai%2Farticle%2Fdownload%2F75%2F60&ei=UTqeVL2nKouXuATG64LYBw&usg=AFQjCNH6yEoT9he5iA_qWSJBZFXWVrXOlg&bvm=bv.82001339,d.c2E, Oct. 16, 2009, 23 pages.

Primary Examiner — Isaac T Tecklu
(74) Attorney, Agent, or Firm — Lowenstein Sandler LLP

(57) ABSTRACT

Implementations of the disclosure provide for a self-amending software builder. A method of the disclosure includes performing at least one test on an application having source code that is stored in a source code repository and has incurred a plurality of code changes by a plurality of users; detecting a failure of the application during the test; identifying, using a processing device, an offending code change of the plurality of code changes corresponding to the failure and at least one dependent code change of the plurality of code changes that depends on the offending code change; and updating, using the processing device, a master copy of the application in view of at least one of the offending code change or the dependent code change.

6 Claims, 4 Drawing Sheets

(56) References Cited

U.S. PATENT DOCUMENTS

| | | | |
|---|---|---|---|
| 2005/0125776 A1* | 6/2005 | Kothari | G06F 11/3672 |
| | | | 717/131 |
| 2005/0262488 A1* | 11/2005 | Wagner | G06F 8/71 |
| | | | 717/144 |
| 2008/0229290 A1* | 9/2008 | Jones | G06F 8/71 |
| | | | 717/137 |
| 2009/0265694 A1 | 10/2009 | Bakowski | |
| 2010/0100867 A1* | 4/2010 | Sindhgatta | G06F 8/75 |
| | | | 717/105 |
| 2011/0022551 A1* | 1/2011 | Dixon | G06F 11/3616 |
| | | | 706/12 |
| 2011/0283270 A1* | 11/2011 | Gass | G06F 8/71 |
| | | | 717/168 |
| 2014/0053135 A1* | 2/2014 | Bird | G06F 8/71 |
| | | | 717/124 |
| 2014/0130016 A1* | 5/2014 | Menghrajani | G06F 8/437 |
| | | | 717/124 |
| 2014/0372983 A1* | 12/2014 | Presley | G06F 11/368 |
| | | | 717/124 |
| 2015/0355998 A1* | 12/2015 | Kogan-Katz | G06F 11/366 |
| | | | 717/101 |

* cited by examiner

SELF-MENDING SOFTWARE BUILDER

TECHNICAL FIELD

The embodiments of the disclosure relate generally to software development and, more specifically, to a self-mending software builder.

BACKGROUND

Software developers frequently make and submit changes to source code managed by revision control systems (e.g., Git). For example, a software developer may make a code change to source code of an application stored in a source code repository hosted by a revision control system. The code change may then be merged into the source code of the application stored in the source code repository. Prior to the code change being merged into the application, it would be desirable to perform various tests on the code change to ensure that the application can work as designed when the code change is integrated with the application. However, testing each code change that is to be merged into the application may be resource consuming and time consuming. As a result, the source code of the application may be tested for deployment after multiple code changes have been merged into the application.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
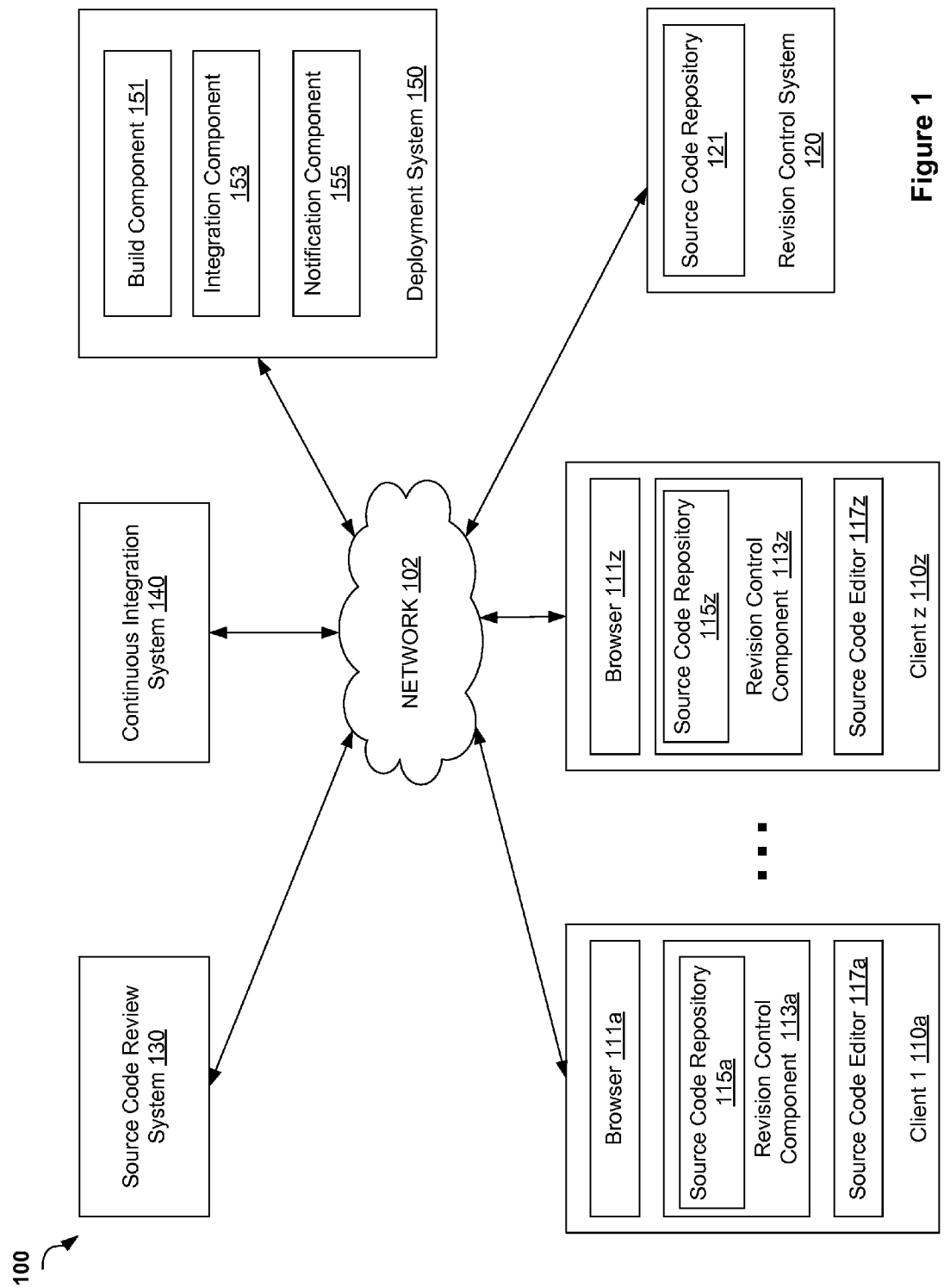
FIG. 1 is a block diagram of a network architecture in which implementations of the disclosure may operate.

Implementations of the disclosure provide for a self-mending software builder. Implementations of the disclosure may perform various tests on source code of an application that include one or more code changes. Upon detecting a failure associated with one or more of the tests, a code change corresponding to the failure (also referred to herein as "offending code change") may be identified. Additionally, one or more code changes depending on the offending code change (also referred to herein as "dependent code changes") may be identified. Implementations of the disclosure may update a master copy of the application by reverting the offending code change and the dependent code changes. For example, implementations of disclosure may make one or more code changes to the master copy of the application to undo changes to the application that were introduced by the offending code change and the dependent code changes.

Alternatively, implementations of the disclosure may revise the source code of the application in view of the offending code change to generate revised source code (also referred to herein as "first revised code"). For example, one or more code changes may be made to the source code of the application to undo changes to the application introduced by the offending code change. Implementations of the disclosure may then initiate a code review process for the first revised code and may perform one or more tests on the first revised code. If the first revised code is approved by the code review process and passes the tests, implementations of the disclosure may update the master copy of the application using the second revised code. Alternatively, if the second revised code is rejected by the code review process and/or fails any of the tests, the master copy of the application may be updated by reverting the offending code change and the dependent code changes.

As referred to herein, an application may include one or more software programs designed to perform any function and may be written in any computer programming language. A code change may correspond to one or more changes to one or more portions of an application. The code change may depend on one or more other code changes to the application (e.g., referring to the other code change(s), being derived from the other code change(s), etc.).

Previously, software build systems did not provide a self-mending build scheme. For example, upon detecting a test failure related to multiple code changes related to an application, a conventional build system would notify owners of the code changes. The owners may have to manually figure out which of the introduced code changes have failed the build process and manually modify the code changes and submit the modified code changes for code review and testing. During this time, the source code of the application is in an unusable state, hindering further development of the application.

Implementations of the disclosure improve conventional build systems by reverting an application to a previous working version upon detecting a test failure or related to a current version of the application. As such, implementations of the disclosure facilitate software development by providing a self-mending building scheme.

FIG. 1 is a block diagram of a network architecture 100 in which embodiments of the disclosure may operate. Network architecture 100 includes one or more client devices 110*a-z* operatively connected to one or more of revision control system 120, source code review system 130, continuous integration system 140, and deployment system 150 via a network 102. The network 102 may be a private network (e.g., a local area network (LAN), a wide area network (WAN), intranet, or other similar private networks) or a public network (e.g., the Internet).

Each of the revision control system 120, the source code review system 130, the continuous integration (CI) system 140, and the deployment system 150 can be implemented on one or more computing devices, such as server devices, desktop computers, laptop computers, mobile devices, etc. In some implementations, each of the client device 110*a-z*, the revision control system 120, the source code review system 130, the continuous integration (CI) system 140, and the deployment system 150 can be implemented using one or more computing devices 400 as described below in connection with FIG. 4.

Each client 110*a-z* may be any type of computing device, for example, a device including a processor, a computer-readable medium, and a memory. Each client 110*a-z* may be, for example, a mobile device, a PDA, a laptop, a desktop computer, or any other computing device. In one implementation, each client 110a-z includes a browser application 111a-z or any other application adapted to communicate over Internet related protocols (e.g., TCP/IP and HTTP) and/or display a user interface.

Each client 110a-z can also include a revision control component 113a-z that provides source code management and/or revision control functionality. Each revision control component 113a-z can include a source code repository 115a-z (also referred to herein as "local repository") for storing source code of one or more applications, code changes to the application(s), and/or any other data related to the application(s). In some implementations, the revision control component 113a-z may be implemented using Git, MERCURIAL™, Subversion, and/or any other suitable revision control system.

In one implementation, each client device 110a-z can include a source code editor application 117a-z ("editor") that can be used by a user to review, edit, and/or perform any other suitable operation on source code of an application. A user of client device 110a-z may make and commit a code change to source code of an application using a command line tool, a graphic user interface, etc. provided by the editor 117a-z. The code change may include one or more changes to one or more portions of the source code. The code change may depend on one or more other code changes (e.g., referring to the other code change(s), being derived from the other code change(s), etc.). The revision control component 113a-z updates the local repository 115a using the code change. For example, the local repository 115a may store the code change in association with a unique identifier identifying the code change, identifying information related to the other code change(s), identifying information related to the user, and/or any other suitable information related to the code change. The code change and the information related to the code change may be provided (e.g., pushed) from the local repository 115a to a remote repository (e.g., the source code repository 121).

The revision control system 120 may include one or more source code repositories 121 (also referred to herein as "remote repository") and/or any other suitable component to provide source code hosting and/or management functionality. The remote repository 121 may store source code of one or more applications and data associated with the source code. In one example, the remote repository 121 stores source code of a master copy of an application and one or more working copies of the application. The master copy of the application may relate to one or more code changes and may be stored in association with identifying information related to the code changes. The master copy of the application on may be stored in association with any suitable information related to the code changes, such as reference data (e.g., a pointer) referring to the latest code change related to the master copy of the application, identifying information related to the code changes (e.g., unique identifiers identifying the code changes), information related to dependencies between the code changes, identifying information related to users that made or committed the code changes, etc.

In one example, the master of the application that may be retrieved, reviewed, edited, etc. by one or more users (e.g., software developers). For example, the local repository 115a may retrieve source code of the master copy of the application from the remote repository 121 upon receiving a "pull" command and/or any other suitable command from a user of the client device 110a (also referred to herein as "first user"). The first user may then make a code change (also referred to herein as "first code change") to the retrieved source code using a command line tool, a graphic user interface, etc. provided by the editor 117a and/or the revision control component 113a. The first user may also commit the first code change (e.g., by issuing a Git "commit" command and/or any other suitable command). The revision control component 113a then updates the local repository 115a using the first code change (e.g., by storing the first code change in association with a unique identifier and/or performing any other operation). The local repository 115a may provide (e.g., "push") the first code change to the remote repository 121.

In some implementations, the first user may request the first code change be submitted to source code review system 130 for code review (e.g., using a command line tool, a graphical user interface, etc. provided by the editor 117a and/or the revision control component 113a). In response to receiving such a request, the revision control component 113a provides (e.g., pushes) the first code change to the source code review system 130. Alternatively or additionally, the revision control component 113a may transmit, to the source code review system 130, an indication that a code review process is to be initiated for the first code change. Upon receiving the indication, the source code review system 130 may retrieve the first code change and/or source code related to the first code change from the source code repository 121.

Upon receiving the first code change, the source code review system 130 may provide the first code change to one or more reviewers (e.g., users of the client device 110a-z and/or any other users) for code review. For example, the source code review system 130 may provide one or more graphical user interfaces to client devices of the reviewers to facilitate the code review. The client device(s) of the reviewer(s) may generate a message indicating that the first code change has been approved by the reviewer(s) and may send the message to the code review system 130.

In one implementation, the source code review system 130 may also provide the first code change to the CI system 140 for code review. The CI system 140 may compile the first code change and/or other source code related to the first code change. The CI system 140 may also perform one or more tests on the code changes, such as one or more unit tests, integration tests, etc. In some implementations, upon successfully compiling the first code change and/or determining that the first code change passes the tests, the CI system 140 may generate a message indicating that the first code change is approved by the CI system 140 and may send the message to the code review system 130.

In response to receiving a message indicating that the first code change has been approved by the reviewer(s) and/or the CI system 140, the source code review system 130 may generate a message indicating that the first code change has been approved by the code review system 130 and may send the message to the client device 110a.

In some implementations, a user may be allowed to merge a given code change into the remote repository 121 when the source code review system 130 ranks the code change as being eligible to be merged (pushed) into the master and to actually perform the merge action. The source code review system 130 may rank the given code change in view of input from the client devices 110a-z, the CI system 140, and/or the deployment system 150. For example, the source code review system 130 may rank the code change as "ready to be merged" in response to receiving input indicating that the reviewers have approved the code change and/or that the code change passes one or more tests executed by the CI system 140 and/or the deployment system 150. The source code review system 130 may then send, to a client device of the user, a request to merge the code change into the remote repository 121.

While the first code change is being reviewed by the reviewer(s) and/or the CI system 140, the master copy of the application hosted in the remote repository 121 may be updated using one or more code changes made by one or more users (e.g., users of the client devices 110a-z). In one example, a second user of the client device 110z may make and commit a second code change and may merge the second code change into the master copy of the application stored in the remote repository 121. More particularly, for example, the second code change may be submitted to the code review system 130 for code review. The code review system 130 may approve the second code change for merging into the remote repository 121 (e.g., upon receiving information indicating that the reviewers have approved the second code change and/or that the second code change passes tests executed by the CI system 140 and/or the deployment system 150). The code review system 130 may then send, to the client device 110z, a request to merge the second code change into the code repository 121. The revision control component 113z may provide (e.g., push) the second code change to the remote repository 121 in response to receiving the request.

Upon receiving a message indicating that the first code change has been approved by the code review system 130, the revision control component 113a may update the master copy of the application using the first code change. For example, the revision control component 113a may retrieve the latest version of the master copy of the application (e.g., the source code including the second code change) from the remote repository 121. The revision control component 113a may then merge the first code change with the master copy of the application. Additionally, the revision control component 113a may associate the first code change with a pointer or any other reference data referring to the latest code change to the master copy of the application. The updated master copy of the application may be stored in the local repository 115a and may be provided (e.g., pushed) to the remote repository 121.

In one implementation, upon the first code change having been merged into the master copy of the application, the revision control system 120 may provide the master copy of the application to the deployment system 150 for testing and/or deployment. Alternatively, the revision control system 120 may provide the master copy of the application to the deployment system 150 after one or more code changes subsequent to the first code change have been merged into the master copy of the application.

In one implementation, the deployment system 150 may include a build component 151, an integration component 153, a notification component 155, and/or any other suitable component to provide a self-mending software builder. More or less components may be included in the deployment system 150 without loss of generality. For example, two of the components may be combined into a single component, or one of the components may be divided into two or more components. In one implementation, one or more of the components may reside on different computing devices (e.g., different server computers).

The build component 151 may implement build, preparation, and/or any other suitable functionality to convert source code into a built result for deployment to a production environment. In one implementation, the build component 151 may receive, from the remote repository 121, a copy of the master copy of the application (also referred to herein as the "first source code"). The first source code may include one or more code changes that have been merged into the master copy of the application, such as the first code change, the second code change, one or more code changes on which the first code change depend, one or more code changes that depend on the first code change, etc.

The build component 151 may also perform one or more tests on the build result. For example, the build component 151 launches and installs the build result in a testing environment (e.g., a staging site) that is similar to or the same as the production environment. The build component 151 may then emulate one or more user actions to test whether the application can perform one or more desired functions, whether the application can generate a desired output, etc.

The build component 151 may determine whether the first source code passes all of the tests. In response to determining that the first source code passes all of the tests, the build component 151 may deploy the first source code to the production environment.

Alternatively, the build component 151 may determine that the first source code fails one or more of the tests and may detect a failure associated with the failed tests. Examples of such a failure include a failure to build, a failure to perform a desired function, a failure to generate a desired output, a failed runtime, etc. In response to detecting a failure associated with one or more of the tests, the build component 151 may identify a code change corresponding to the failure (also referred to herein as "offending code change"). The offending code change may be identified by a unique identifier. The offending code change may be identified using any suitable technique or combination of techniques. For example, the build component 151 may identify a good code change (e.g., a code change that passes the tests) and a bad code change (e.g., a code change that fails the tests) following the good code change. The build component 151 may then identify the bad code change as being the offending code change. In one implementation, the offending code change may be identified using one or more binary search algorithms, such as a bisection algorithm. In another implementation, the offending code change can be identified by serially testing multiple code changes that might result in the failure.

The build component 151 may also identify one or more code changes dependent on the offending code change (also referred to herein as the "dependent code changes"). The dependent code changes may be identified using information related to dependencies between code changes related to the master copy of the application.

The notification component 155 may send a message to one or more users that made, submitted, or edited the offending code change. The message may include any information indicating that the offending code change has caused the failure.

In one implementation, upon identifying the offending code change and/or the dependent code changes, the build component 151 may revise the first source code in view of the offending code change to generate revised code (also referred to herein as the "first revised code"). For example, the build component 151 may make one or more code changes to the first source code to undo changes to the master copy of the application that were introduced by the offending code change (e.g., via a Git "revert" command and/or any other suitable command).

The build component 151 may then initiate a code review process for the first revised code. For example, the build component 151 may provide the first revised code to the code review system 130 for code review. The code review system 130 may facilitate a code review process (e.g., by providing the first revised code to one or more reviewers and/or the CI system 140 for code review). The code review system 130 may send, to the deployment system 150, a message indicating whether the first revised code has been approved by the code review process.

In some implementations, the build component 151 may perform one or more tests on the first revised code in response to receiving a message indicating that the first revised code has been approved by the code review process. For example, the build component 151 may implement build, preparation, and/or any other suitable functionality to convert the first revised code into a built result. The build component 151 may also launch and install the build result in the testing environment (e.g., a staging site). The build component 151 may then emulate one or more user actions to test whether the application can perform one or more desired functions, whether the application can output a desired output, etc.

In some implementations in which the first revised code passes all of the tests, the integration component 153 may update the master copy of the application using the first revised code. For example, the integration component 153 may retrieve, from the remote repository 121, the latest version of the master copy of the application (also referred to herein as the "second source code"). The integration component 153 may then update the second source code using the revised source code. For example, the integration component 153 may merge the first revised code into the second source code (e.g., via a Git "merge" command and/or any other suitable command) and may then provide the merged source code to the remote repository 121.

The second source code may or may not be the same as the first source code. For example, while the build component 151 is building, testing, revising, and/or performing any other action on the first source code, code changes that are not included in the first source code may be merged into the master copy of the application and stored in the remote repository 121. In another example, the second source code is the same as the first source code.

In another implementation, the build component 151 may generate revised code (also referred to herein as "second revised code") in view of the offending code change and the dependent code changes. For example, the second revised code may be generated by making one or more code changes to undo changes to the application that were introduced by the offending code change and the dependent code changes (e.g., via a Git "revert" command and/or any other suitable command).

In one implementation, the second revised code can be generated upon determining that the first revised code fails one or more of the tests and/or that the revised source code is not approved by the code review system 140. In another implementation, the second revised code can be generated upon identifying the offending code change and/or the dependent code changes. The integration component 153 may then update the master copy of the application using the second revised code.

Figure 2:
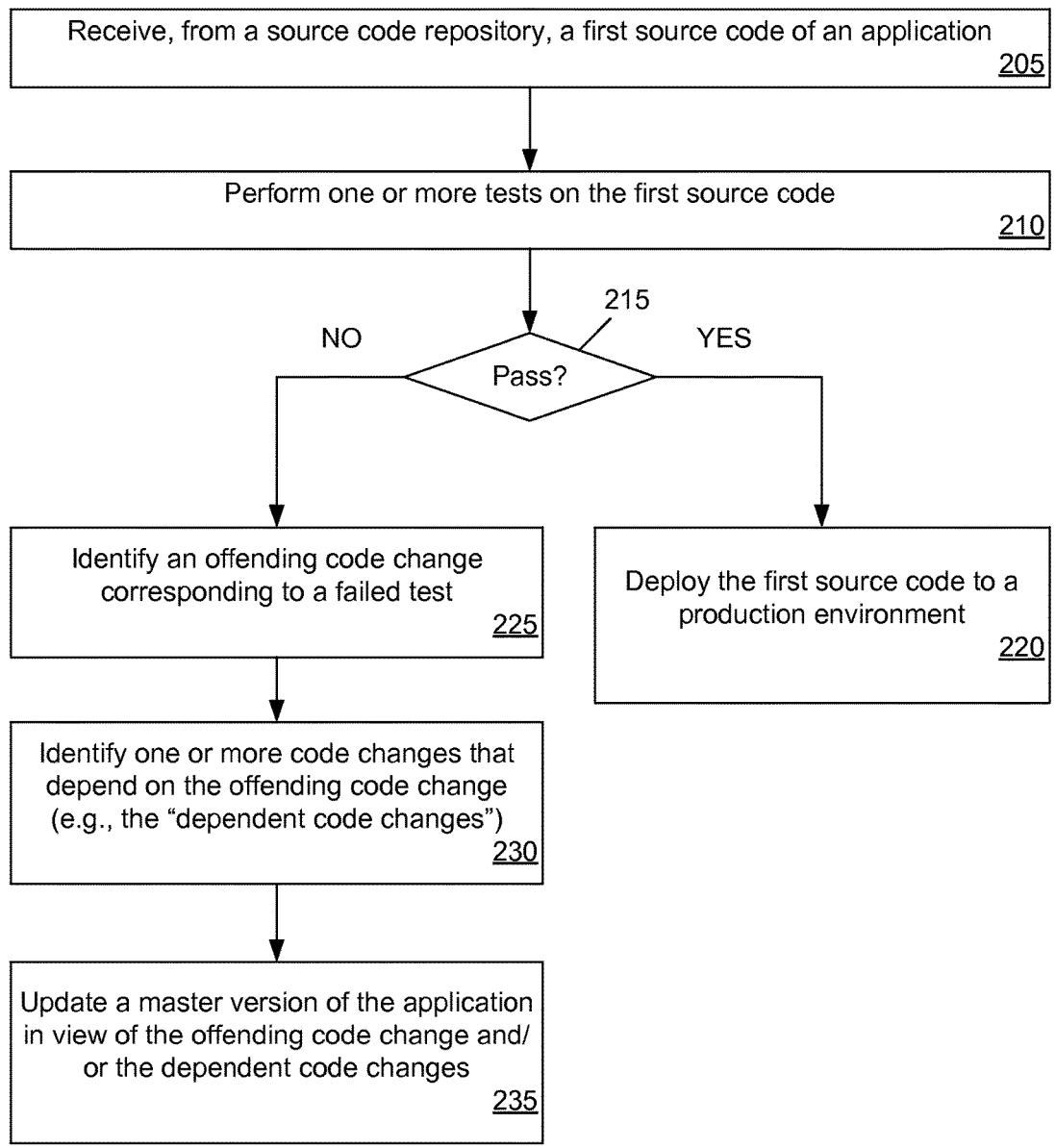
FIG. 2 is a flow diagram illustrating a method for providing a self-mending software builder according to an implementation of the disclosure.

FIG. 2 is a flow diagram illustrating a method 200 for providing a self-mending software builder according to an embodiment of the disclosure. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 may be performed by a processing device (e.g. a processing device 402 of FIG. 4) of a deployment system (e.g., the deployment system 150 as described in connection with FIG. 1).

Method 200 begins at block 205 where the processing device receives, from a source code repository, a first source code of an application. The first source code can correspond to a master copy of the application hosted by the source code repository. In one implementation, the source code repository can be a remote repository 121 as described above in connection with FIG. 1. In some implementations, the first source code has incurred multiple code changes by multiple users.

At block 210, the processing device can perform one or more tests on the first source code. For example, the processing device can implement build, preparation, and any other suitable functionality to convert the first source code into a build result and deploy the source code to a testing environment. The processing device can then run one or more tests on the deployed source code.

At block 215, the processing device can determine whether the first source code passes the tests. In some implementations, in response to determining that the first source code passes all of the tests, the processing device can proceed to block 220 and can deploy the first source code to a production environment.

Alternatively, in response to detecting a failure associated with one or more of the tests (e.g., "NO" at block 215), the processing device can proceed to block 225 and can identify an offending code change corresponding to the failure. The offending code change may correspond to one or more changes to one or more portions of a previous version of the source code. The offending code change may be identified by a unique identifier.

At block 230, the processing device can identify one or more code changes that depend on the offending code change (also referred to herein as the "dependent code changes"). Each of the dependent code changes may be identified by a unique identifier.

At block 235, the processing device can update a master copy of the application in view of the offending code change and/or the dependent code changes. In one example, the processing device revises the first source code by making one or more code changes to undo changes to the application that were introduced by the offending code change and the dependent code changes. The processing device then updates the master copy of the application using the revised first source code. More particularly, for example, the processing device may obtain a latest version of the master copy from the source code repository. The processing device may then merge the revised first source code into the latest version of the master copy (e.g., via a Git "merge" command and/or any other suitable command).

In another example, the processing device can update the master copy of the application by performing one or more operations as described below in connection with FIG. 3.

Figure 3:
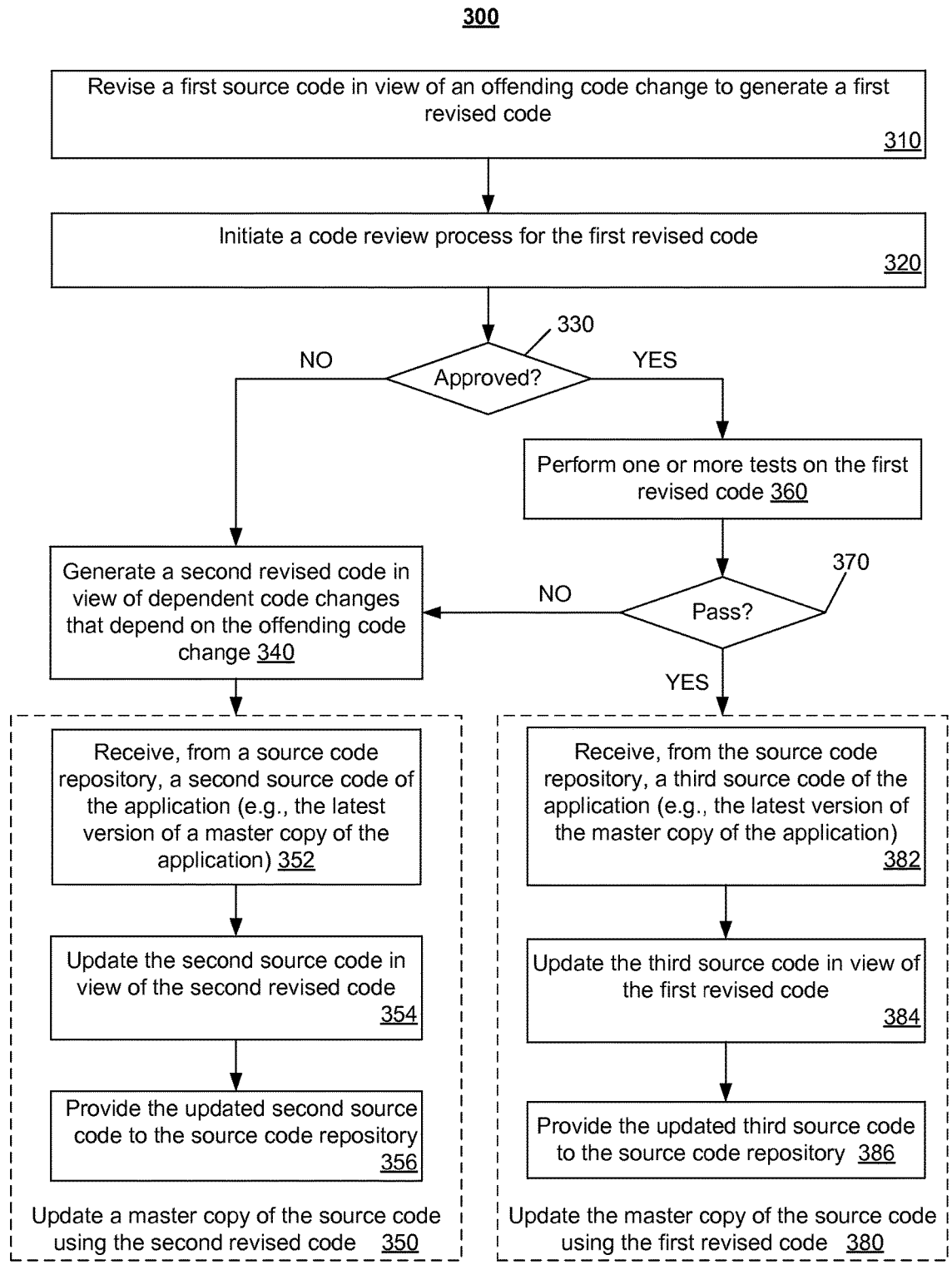
FIG. 3 is a flow diagram illustrating a method for updating a master copy of an application in view of an offending code change according to an implementation of the disclosure.

FIG. 3 is a flow diagram illustrating a method 300 for updating a master version of an application in view of an offending change according to an embodiment of the disclosure. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 may be performed by a processing device (e.g. a processing device 402 of FIG. 4) of a deployment system (e.g., the deployment system 150 as described in connection with FIG. 1).

Method 300 begins at block 310 where the processing device revises a first source code of an application in view of an offending code change to generate a first revised code. In one implementation, the processing device makes a new code change to the first source code to undo changes to the application that were introduced by the offending code change. The first source code can correspond to a master copy of the application. The first source code has incurred a plurality of code changes by a plurality of users in some implementations. The offending code change can correspond to a failure associated with one or more tests executed on the first source code and can be identified as described above in connection with FIGS. 1 and 2.

At block 320, the processing device can initiate a code review process for the first revised code. For example, the processing device can provide the first revised code to a code review system (e.g., the code review system 130 of FIG. 1) for code review.

At block 330, the processing device can determine whether the first revised code has been approved by the code review system. For example, the processing device makes this determination upon receiving, from the code review system, a message indicating whether the first revised code has been approved by the code review system.

In response to determining that the first revised code has been rejected by the code review system (e.g., "NO" at block 330), the processing device can proceed to block 340 and generate a second revised code in view of dependent code changes that depend on the offending code change. For example, the processing device can generate the second revised code by making one or more code changes to the first revised code to undo changes to the application introduced by the dependent code changes. In another example, the processing device can generate the second revised code by making one or more code changes to the first source code to undo changes to the application introduced by the offending code change and the dependent code changes.

At block 350, the processing device can update a master copy of the application using the second revised code. In one implementation, the processing device may update the master copy of the application by performing one or more operations depicted in blocks 352-356.

At block 352, the processing device can receive, from a source code repository, a second source code of the application. In some implementations, the second source code corresponds to the latest version of the master copy of the application. The source code repository may be the remote repository 121 as described above in connection with FIG. 1. The second source code may or may not be the same as the first source code.

At block 354, the processing device can update the second source code using the second revised code. For example, the processing device merges the second revised source code into the second source code (e.g., via a Git "merge" command and/or any other suitable command). At block 356, the processing device can provide the updated second source code to the source code repository.

In some implementations, in response to determining that the first revised code has been approved by the code review system (e.g., "YES" at block 330), the processing device can proceed to block 360 and can perform one or more tests on the first revised code.

At block 370, the processing device can determine whether the first revised code passes all of the tests. In response to determining that the first revised code passed all of the tests, the processing device can proceed to block 380 and update the master copy of the application using the first revised code. In some implementations, the processing device can update the master copy of the source coded by performing one or more operations depicted in blocks 382-386.

At block 382, the processing device receives, from the source code repository, a third source code of the application. The third source code can correspond to the latest version of the master copy of the application. The third source code may or may not be the same as the first source code or the second source code.

At block 384, the processing device can update the third source code using the first revised code. At block 386, the processing device can provide the updated third source code to the source code repository.

Alternatively, in response to determining that the first revised code failed one or more of the tests, the processing device can proceed to block 340 and can generate the second revised code. The processing device can then update the master copy of the application using the second revised code at block 350.

Figure 4:
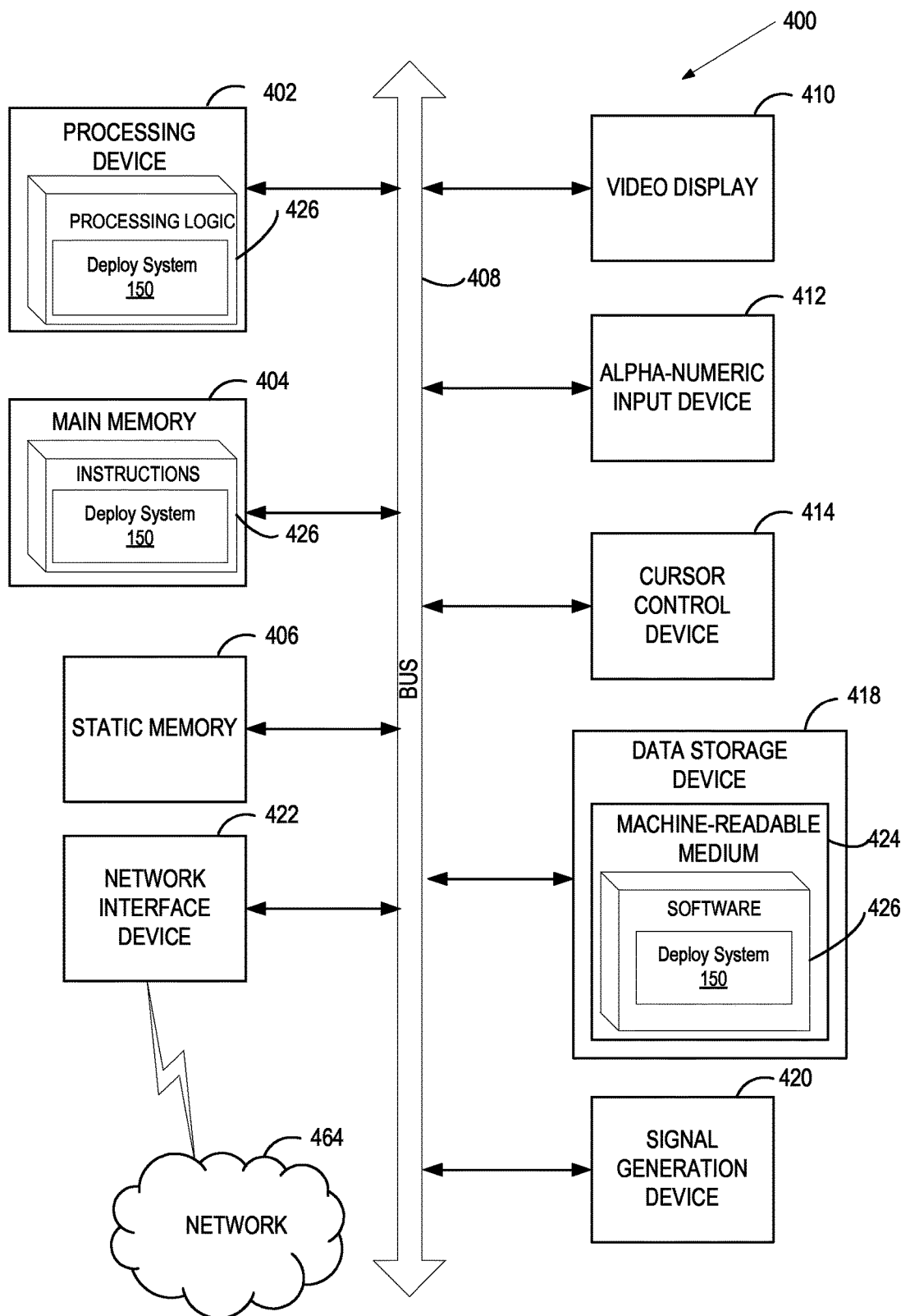
FIG. 4 illustrates a block diagram of one implementation of a computing device.

FIG. 4 illustrates a diagrammatic representation of a machine in the example form of a computing device 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer device 400 includes a processing device 402 (e.g., processor, CPU, etc.), a main memory 404 (e.g., read-only memory (ROM), flash memory, dynamic random access memory (DRAM) (such as synchronous DRAM (SDRAM) or DRAM (RDRAM), etc.), a static memory 406 (e.g., flash memory, static random access memory (SRAM), etc.), and a data storage device 418, which communicate with each other via a bus 808.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 422 communicably coupled to a network 464. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 418 may include a machine-accessible storage medium 424 on which is stored software 426 embodying any one or more of the methodologies of functions described herein. The software 426 may also reside, completely or at least partially, within the main memory 404 as instructions 426 and/or within the processing device 402 as processing logic 426 during execution thereof by the computer system 400; the main memory 404 and the processing device 402 also constituting machine-accessible storage media.

The machine-readable storage medium 424 may also be used to store instructions 426 to provide software build functionality, such as the source code review system 130, the continuous integration system 140, and the deployment system 150 as described with respect to FIG. 1, and/or a software library containing methods that call the above applications. While the machine-accessible storage medium 424 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending," "receiving," "creating," "activating," "providing," "executing," "submitting," "committing," "storing," "performing," "merging," "revising," "updating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first," "second," "third," "fourth," etc. as used herein are meant as labels to distinguish among different elements and may not necessarily have an ordinal meaning according to their numerical designation.

The disclosure also relates to an apparatus for performing the operations herein. This apparatus may be specially constructed for the purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:
1. A method comprising:
storing a first master copy of an application, wherein the first master copy comprises information relating to a plurality of dependencies associated with source code of the application;

performing a first test on the source code that is stored in a source code repository and has incurred a plurality of code changes by a plurality of users;

detecting a failure of the application during the first test;

identifying, using a processing device, an offending code change of the plurality of code changes that corresponds to the failure, wherein the offending code change and at least one dependent code change are associated with one another by a first dependency of the plurality of dependencies, and wherein respective unique identifiers are assigned to the offending code change and the at least one dependent code change;

identifying, using the first dependency and the respective unique identifiers, the at least one dependent code change that depends on the offending code change;

revising, by the processing device, the source code of the application to undo the offending code change and the at least one dependent code change and generate a first revised code corresponding to the first master copy;

performing a second test on the first revised code; and in response to determining the first revised code passed the second test, generating an updated master copy comprising the first revised code.

2. The method of claim 1, wherein the offending code change is identified using a binary search algorithm.

3. A system comprising:

a memory to store instructions and a first master copy of an application, wherein the first master copy comprises information relating to a plurality of dependencies associated with source code of the application; and a processing device, operatively coupled to the memory, to execute the instructions to cause the processing device to:

perform a first test on the source code that is stored in a source code repository and has incurred a plurality of code changes by a plurality of user;

detect a failure of the application during the first test;

identify an offending code change of the plurality of code changes that corresponds to the failure, wherein the offending code change and at least one dependent code change are associated with one another by a first dependency of the plurality of dependencies, and wherein respective unique identifiers are assigned to the offending code change and the at least one dependent code change;

identify, using the first dependency and the respective unique identifiers, the at least one dependent code change that depends on the offending code change;

revise the source code of the application to undo the offending code change and the at least one dependent code change and generate a first revised code corresponding to the first master copy;

perform a second test on the first revised code; and in response to a determination that the first revised code passed the second test, generate an updated master copy comprising the first revised code.

4. The system of claim 3, wherein the offending code change is identified using a binary search algorithm.

5. A non-transitory machine-readable storage medium comprising instructions that, when accessed by a processing device, cause the processing device to:

store a first master copy of an application, wherein the first master copy comprises information relating to a plurality of dependencies associated with source code of the application;

perform a first test on the source code that is stored in a source code repository and has incurred a plurality of code changes by a plurality of user;

detect a failure of the application during the first test;

identify an offending code change of the plurality of code changes that corresponds to the failure, wherein the offending code change and at least one dependent code change are associated with one another by a first dependency of the plurality of dependencies, and wherein respective unique identifiers are assigned to the offending code change and the at least one dependent code change;

identify using the first dependency and the respective unique identifiers, the at least one dependent code change that depends on the offending code change;

revise the source code of the application to undo the offending code change and the at least one dependent code change and generate a first revised code corresponding to the first master copy;

perform a second test on the first revised code; and in response to a determination that the first revised code passed the second test, generate an updated master copy comprising the first revised code.

6. The non-transitory machine-readable storage medium of claim 5, wherein the offending code change is identified using a binary search algorithm.

* * * * *